J. C. HOUGHTON & L. A. HILL.
CARBURETER.
APPLICATION FILED DEC. 7, 1914.

1,164,093.

Patented Dec. 14, 1915.
4 SHEETS—SHEET 2.

Witnesses
Edwin L. Bradford
Helge Murray

Inventors
James C. Houghton
Louis A. Hill
By Wm. C. Dyre
Attorney

J. C. HOUGHTON & L. A. HILL.
CARBURETER.
APPLICATION FILED DEC. 7, 1914.

1,164,093.

Patented Dec. 14, 1915.
4 SHEETS—SHEET 3.

J. C. HOUGHTON & L. A. HILL.
CARBURETER.
APPLICATION FILED DEC. 7, 1914.

1,164,093.

Patented Dec. 14, 1915.

Witnesses
Edwin L. Bradford
Helge Murray

Inventors
James C. Houghton
and Louis A. Hill
By Wm. E. Dyre
Attorney

UNITED STATES PATENT OFFICE.

JAMES C. HOUGHTON AND LOUIS A. HILL, OF WASHINGTON, DISTRICT OF COLUMBIA.

CARBURETER.

1,164,093. Specification of Letters Patent. Patented Dec. 14, 1915.

Application filed December 7, 1914. Serial No. 875,846.

*To all whom it may concern:*

Be it known that we, JAMES C. HOUGHTON and LOUIS A. HILL, citizens of the United States, residing at Washington, in the District of Columbia, have invented certain new and useful Improvements in Carbureters; and we do hereby declare the following to be a full, clear, and exact description of the invention, such as will enable others skilled in the art to which it appertains to make and use the same.

This invention relates to certain new and useful improvements in carbureters for producing an explosive mixture of liquid hydrocarbon and air for use in internal-combustion engines.

The primary object of this invention is the production of a carbureter in which the liquid fuel fed from any suitable source of supply is forced from a float feed reservoir and commingles with the air supply under a degree of pressure which is predetermined, and automatically controlled, so as to present at all times a charge of liquid fuel in excess of the actual demands of the engine in connection with which the carbureter is used.

Another object of this invention is the production of means for positively delivering the liquid fuel into the air supply under pressure, said means being preferably located between the float feed reservoir and the point of discharge, and entirely submerged within the liquid fuel.

A further object of the present invention is the production of means whereby any liquid fuel which may be pumped in excess of the momentary requirements of the engine may be automatically returned to the float feed reservoir. This means consisting of a variable pressure regulating or by-pass valve located between the float reservoir and the point of fuel discharge, and capable of automatic control in conjunction with the air controlling or throttle valve.

A still further object of this invention is the production of means whereby the throttle or air controlling valve, the variable pressure regulating valve, and the relative throw of the operating throttle lever may be independently and separately adjusted without disturbing any other adjustment already made.

A further object is the provision of means whereby the conditions of partial vacuum existing in the engine manifold and the float feed reservoir are equalized at all times.

With these and other objects and advantages in view the present invention consists in the novel arrangement and combination of parts hereinafter particularly described and pointed out in the claims following.

In the accompanying drawings which form part of this application for Letters Patent, and whereon corresponding reference characters indicate like parts in the several views: Figure 1 represents in side elevation the improved carbureter completely assembled. Fig. 2 is a top plan view thereof.

The preferred embodiment of this invention contemplates and includes a float feed supply reservoir, a pressure chamber containing a submerged pump capable of supplying liquid fuel in excess of the demands of the engine, a variable pressure regulating valve for permitting the return of said excess fuel into the supply reservoir, and means for automatically actuating the pressure regulating device in conjunction with the throttle valve of the carbureter.

Figure 5:
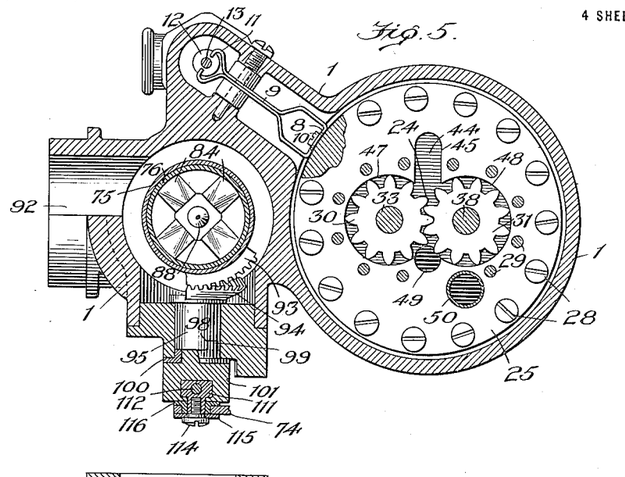
Fig. 5 is a horizontal sectional view on the zig-zag line 5—5 of Fig. 3.
Figure 7:
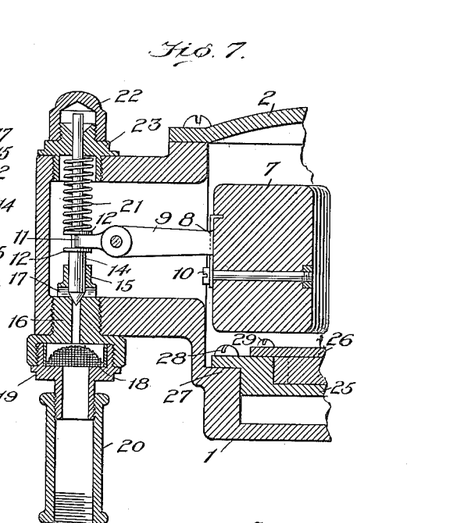
Fig. 7 is a fragmentary detail view showing in vertical section the float-controlled fuel feed supply.

Reference being had to the drawings and characters thereon, it will be seen that the carbureter comprises a casing 1 provided with a suitable flanged cover 2 secured thereon, which cover is in turn adapted to be securely attached to the manifold or other part of an internal-combustion engine by bolts or other securing means, not shown. Located within this casing 1 are the float reservoir 3, the pressure chamber 4, and the chamber 5 in which latter the air throttle valve is positioned, and in the upper end of which is provided the mixing chamber 6. Within the float reservoir 3 is located a float 7 of hollow metal construction, cork or other buoyant material suitably fastened to one end 8 of a pivoted lever 9. This float is secured to its lever 9 by means of a retaining screw 10, or it may be otherwise attached, and by preference the said lever is formed from a strip of sheet metal bent to the desired shape, as shown by Fig. 5, and bifurcated at its pivotal end 11 to engage collars 12 carried by the stem 13 of a vertically movable needle valve 14. The inner end 15 of a perforated plug 16 forms the guide and seat for this valve 14, the said inner end being also provided with lateral openings 17 for the admission of fuel when the needle valve is opened. Within this perforated plug 16 is provided a suitable straining device 18 held in place by the cap 19 to which is secured the usual fitting 20 for connection with the source of fuel supply. The needle valve 14 is provided with a spring 21 surrounding its stem 13, the function of this spring being to partially counterbalance the float 7 and assist in seating said valve, and to keep it seated at all times except when the fuel level in reservoir 3 drops below the prearranged so-called constant level. And by reference to Fig. 7 it will be noted that said valve and its coöperating parts may be readily adjusted or removed and replaced, as occasion requires, through removal of the cap nuts 22 and 23; the float 7 and needle valve 14 aforesaid operating in the usual and well understood manner to insure at all times a supply of liquid fuel within the float feed reservoir 3, and maintain it at practically a constant level.

Figure 3:
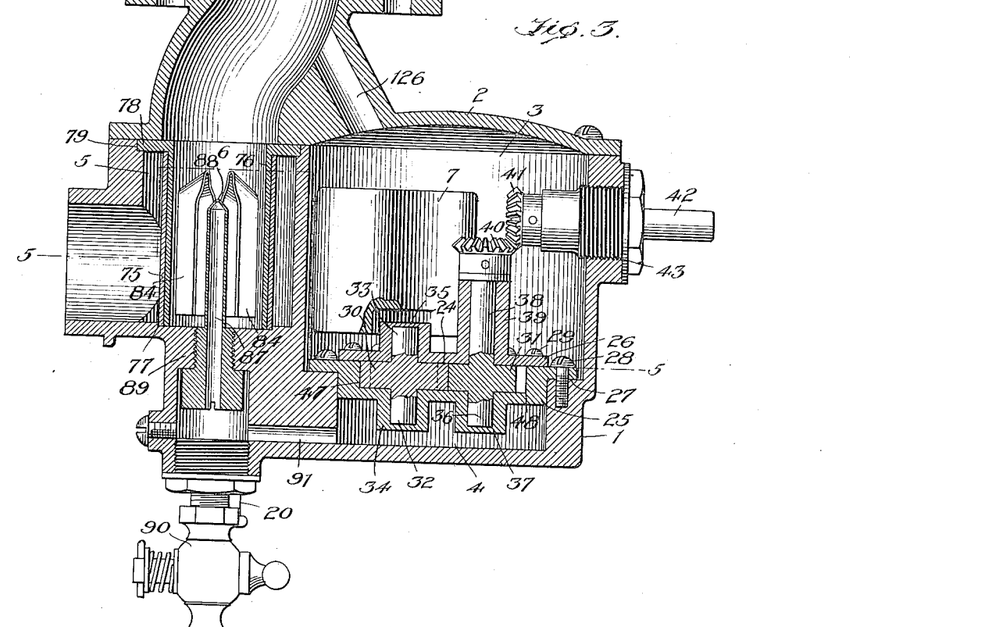
Fig. 3 is a central vertical section of the invention, taken on the line 3—3 of Fig. 2.

The pressure chamber 4 hereinbefore referred to is located below the float reservoir 3, and intermediate of these is a pump casing containing a submerged pressure pump 24. This chamber 4 lies between the bottom of the carbureter casing 1 and a recessed plate 25 forming the body of said pump casing, while a superimposed plate 26 constituting a cover for this casing serves to inclose the pressure pump 24 of rotary type. The plate 25 is secured to an annular shoulder 27 upon the interior of casing 1 by means of screws 28, the cover 26 being similarly secured to plate 25 by screws 29 as best shown by Figs. 3 and 4.

The pressure pump comprises two intermeshing horizontally arranged gears 30 and 31 the teeth of which constitute the forcing means whereby the liquid fuel is pumped. The gear 30 is provided with stub shafts 32 and 33, having suitable bearings 34, and 35 in the plates 25 and 26, respectively forming the pump casing. The pump gear 31 is similarly provided with a stub shaft 36 having a suitable bearing 37 in plate 25, and an extended shaft 38 having a full length bearing 39 in the plate or pump cover 26. To the upper end of said shaft 38 is secured a bevel gear 40 meshing with a similar gear 41 secured to a driving shaft 42, which latter projects into the carbureter casing 1 through a removable bearing 43 affixed to said casing.

To the projecting end of shaft 42 power is applied from any suitable source. That is to say, this power may be derived from the engine itself and transmitted to the pressure pump, or it may be derived from an independent source such as a separate motor under control of the operator. For the purposes of this invention it is sufficient to say that power is applied to this shaft 42, and that it in turn imparts motion to the pump which always supplies fuel in excess of requirements of the engine; and, while a form of rotary gear pump is herein shown and described it will be understood that any other suitable pumping means may be employed within the casing, provided it is situated below the constant liquid level.

Figure 4:
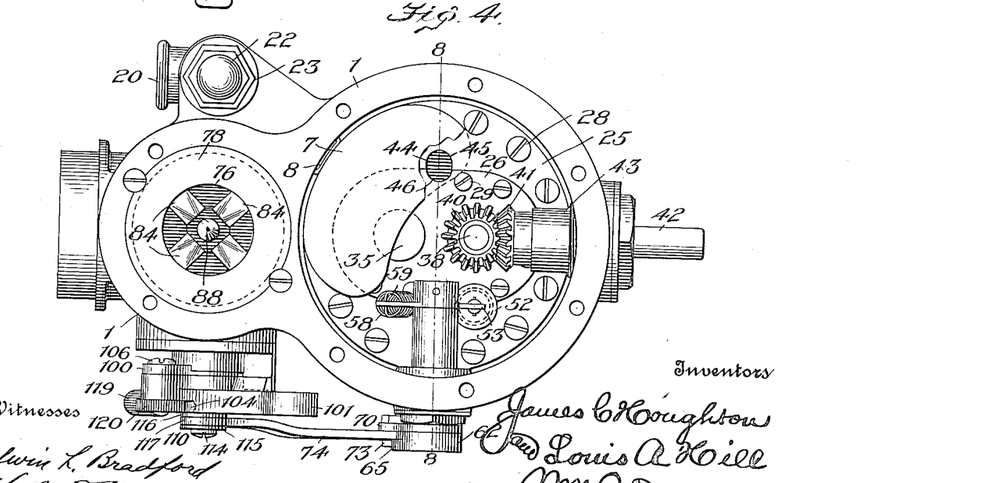
Fig. 4 is a top plan view of the carbureter with the cover section leading to the manifold of the engine, removed.
Figure 8:
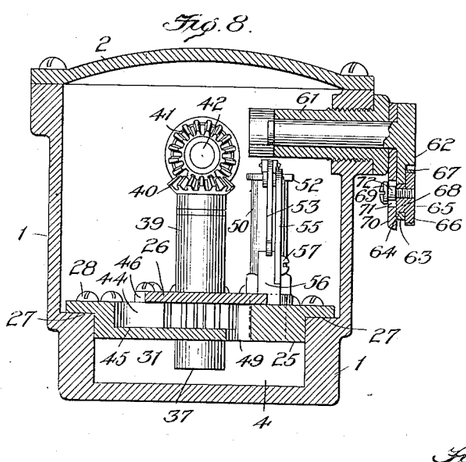
Fig. 8 is a vertical transverse sectional view taken on the line 8—8 of Fig. 4.

In practice, the liquid fuel when pumped from the float reservoir 3 into pressure chamber 4 passes through a conduit 44 formed by the cutaway portions 45 and 46 in the pump casing plates 25 and 26, respectively, as shown by Figs. 4, 5 and 8 of the drawings. This conduit 44, as shown by Fig. 8, extends beneath the plate 26 and directly into the path of travel of the pump gears 30 and 31, the liquid fuel being thereby caught and forced onward by the teeth of said gears, rotating as aforesaid within the circular chambers 47 and 48 of the pump casing as shown by Fig. 5. Upon leaving the pump casing the liquid fuel passes thence through an opening or port 49 into the pressure chamber 4 beneath, and it will be noted that the location and contour of the several passages and conduits leading to and from the pressure pump as aforesaid are designed, arranged and adapted to facilitate the rapid, efficient and forcible delivery of the liquid fuel under all conditions.

Figure 9:
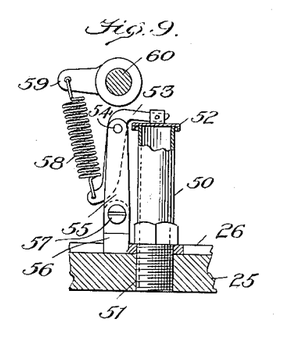
Fig. 9 is a detail view of the variable pressure regulating valve detached.

The variable pressure regulating valve designed to operate between the float reservoir 3 and the pressure chamber 4 will now be described: Referring particularly to Figs. 5, 8 and 9, this valve consists of a stand-pipe or tube 50 secured to and rising from the plate or cover 25 of the pump casing by means of the screw-threaded connection 51. This pipe or tube 50 is in direct communication with the interior of pressure chamber 4 and rises within the float reservoir 3 to a point above the constant liquid fuel level. A flanged valve 52 is seated upon the upper end of this pipe or tube 50, and is adapted to be opened by the return of excess liquid fuel from pressure chamber 4, or may be closed by the action of a spring under control of the air throttle valve, as will later appear. This valve 52 is secured to one end of a valve lever 53 pivoted at 54 upon a fixed support 55, which latter in turn is secured to a base block 56 by screw 57. The said block 56 also serves as a stop for one end of the valve lever 53, thereby limiting the opening of valve 52, as shown by Figs. 8 and 9. A tension spring 58 is secured to the lever 53 and also to the end of an arm 59 projecting from a rock-shaft 60 through which the tension of said spring is controlled.

The shaft 60 to which said arm 59 is attached is journaled in a tubular sleeve 61 threaded into the side of casing 1, as best shown by Fig. 8, while the outer end of this same shaft 60 is provided with a depending arm 62 (see Figs. 1 and 8) having a reduced or cut-away portion 63, and an opening 64 for the reception of an eccentrically mounted adjusting thumb nut 65. This thumb-nut is provided with a knurled head 66 the notches of which are engaged by a tooth upon spring 67 adapted to retain said nut in any of its adjusted positions. The eccentric portion 68 of this thumb nut 65 operates within the corresponding opening 64, and when turned causes the depending arm 62 to rock slightly, thereby turning shaft 60 with its arm 59, and regulating the variable tension of spring 58 which is to be overcome whenever the variable pressure regulating valve 52 is lifted. The thumb nut 65 is held within the reduced portion 63 of depending arm 62 by a screw 69 upon which said nut is mounted eccentrically, this same screw 69 also serving to secure said depending arm 62 to a lever 70 mounted upon the shaft 60. This lever 70 is provided with a slot 71 adapted to receive an enlarged portion 72 upon screw 69 thereby contributing to the ready and exceedingly fine adjustment of depending arm 62 with relation to the lever 70. The said lever 70 is pivotally connected at 73 to a link 74, which link in turn is connected with the main controlling lever of the air throttle valve. Thus it will be seen that an initial adjustment of the carbureter can readily be effected by moving thumb-nut 65 thereby relatively increasing or decreasing the tension of spring 58 to which valve 52 is operatively connected. This adjustment may be made independently of the throttle lever and when so made the variable pressure regulating valve 52 will be permitted to open more or less according to varying speed and load requirements, while returning to reservoir 3 excess quantities of liquid fuel from the pressure chamber 4.

Figure 6:
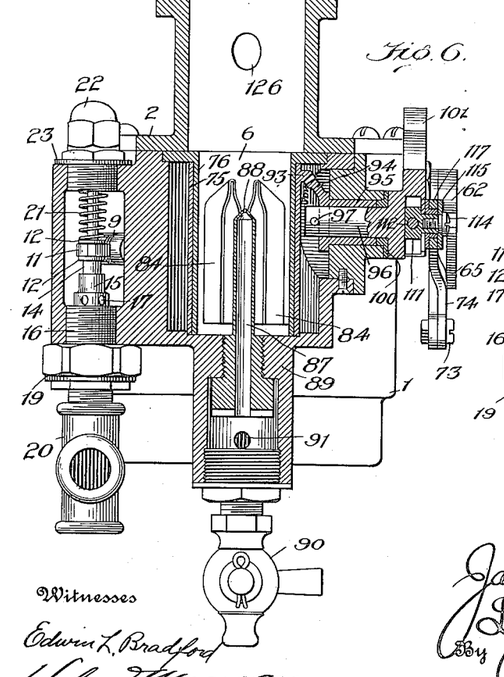
Fig. 6 is a vertical transverse sectional view on the line 6—6 of Fig. 2.
Figures 12, 13:
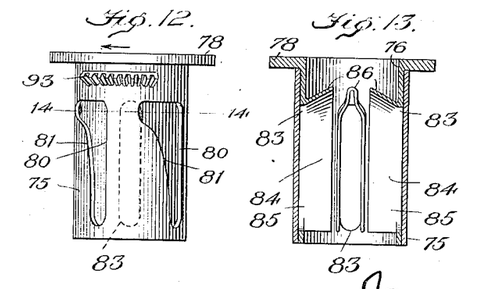
Fig. 12 is a detail view in side elevation of the air throttle valve detached.
Fig. 13 is also a detail vertical sectional view through said valve.

The throttle valve to which the variable pressure regulating valve 52 is connected by means of the link 74 will now be described. This feature of invention located within chamber 5 of casing 1, comprises outer and inner sleeves 75 and 76, respectively, retained in position by means of recessed portions 77 formed in the bottom of chamber 5, and a flange 78 upon sleeve 76 extending into an annular recess 79 formed in the upper part of said chamber 5, as shown by Figs. 3 and 6. The outer sleeve 75 of this throttle valve is adapted to oscillate about the inner sleeve 76 which is nonrotatable, and by reason of this oscillatory movement of the outer sleeve upon and about the said inner sleeve certain ports in both of said sleeves are brought into and out of register for the purpose of producing a proper mixture of liquid fuel and air. The outer sleeve 75 is provided with ports or openings 80 (see Figs. 12 and 14) of approximately triangular contour, the hypotheneuse 81 of which is curved substantially as shown by Fig. 12. The purpose of so forming these ports or openings 80 is to insure a gradual increase in the admission of air used in the explosive mixture, the dotted lines in Fig. 12 indicating the relative position of ports in the inner sleeve 76 when the engine is throttled down to slow speed, the finer adjustment hereinbefore described depends, of course, upon atmospheric and other conditions well known in the art to which this invention belongs.

So far as concerns the air throttle valve, however, it is obvious that oscillation of sleeve 75 to the left as indicated by the arrow in Fig. 12, gradually uncovers the ports of the inner sleeve 76 to admit a gradually increasing quantity of air thereby producing a very efficient mixture; registration of these ports being complete when the valve is fully open to admit the maximum quantity of air for high speeds.

Figure 14:
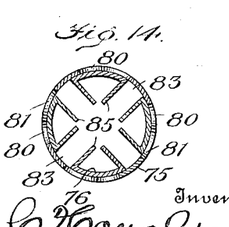
Fig. 14 is a detail horizontal sectional view of the throttle valve shown by Figs. 12 and 13, and, Fig. 15 is a fragmentary detail sectional view on the line 15—15 of Fig. 1, showing the adjustable connection between the throttle valve and the variable pressure valve, whereby the throw of the said throttle lever may be adjusted independently of the said valves.

The inner sleeve 76 of the air throttle valve is provided with openings 83 formed by channel shaped members 84 each comprising side walls 85 and upper constricted ends 86, as shown by Figs. 6, 13 and 14. These upper ends are angularly disposed and serve to direct the air, in currents, to the center of the structure, and directly into the path of the liquid fuel. Centrally positioned within the sleeves 75 and 76 is a fuel jet-tube 87 having an outlet nozzle 88 of conical or constricted formation for delivering a forced feed or stream of liquid fuel, and thoroughly commingling same with the several streams of air, or air jets discharging into the same path immediately above. The said liquid fuel discharge tube 87 is constructed and arranged to be readily screwed into the depending portion 89 of the carbureter casing 1, thereby providing for its ready removal for purposes of cleaning, and for such other purposes as occasion may require. While immediately below is provided a pet cock 90 for purposes of draining, and for obtaining a supply of liquid fuel for other useful purposes. The liquid fuel in passing from the pressure chamber 4 through the conduit 91 is at all times under a head or pressure which exceeds the demands of the engine, but because of the interconnection between the air throttle control and the variable pressure regulating mechanism hereinbefore described, only so much of the liquid fuel as may be required is actually utilized, the remainder being automatically forced back or returned into the float feed reservoir 3, by way of the valve 52.

Figure 11:
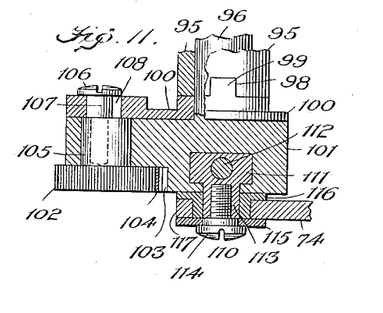
Fig. 11 is an enlarged sectional detail view of the adjustable connection for the throttle valve, indicated on the line 11—11 of Fig. 1.

The mechanism for regulating and controlling the admission of air primarily into and through the inlet port 92, guarded by the air throttle valve aforesaid, comprises a bevel segment 93 secured to the outer sleeve 75 (Figs. 5, 6 and 12), constantly meshing with a similar segment 94 formed on the inner end of a sleeve 95 journaled around shaft 96, and held therein by a pin 97. In the opposite or outer end of this same sleeve 95 is a recess or notch 98 (Figs. 5 and 11) adapted to receive a key or lug 99 formed upon the inner end of an arm or lever 100. Secured to this arm or lever 100, and relatively adjustable therewith, is the main operating lever 101 to the end of which is fastened a rod (not shown) leading to a suitable hand lever (not shown) under control of the operator. This lever 101 is adjustably secured to the said arm 100 by means similar to that hereinbefore described in connection with the variable pressure regulating valve and its operative connections. That is to say, a knurled thumb nut 102 is provided within a recessed portion 103 of throttle lever 101, the same being adjustably held in position by the engaging tooth of a spring 104 (see Figs. 1 and 11). Furthermore, an eccentric 105 is positioned within an opening of corresponding shape in throttle lever 101. This eccentric is formed integral with the thumb-nut 102, and is held eccentrically within the said lever 101 by screw 106.

A collar 107 is provided on this screw 106 and operates in slot 108 formed in the arm 100, thereby providing for the relative movement of said arm 100, and the throttle lever 101, when the thumb-nut 102 is turned one way or the other. When this nut is turned it will be seen that the movement of the arm 100 transmits movement therough the engaging lugs to the throttle valve sleeve 75 by agency of the segmental rack or gear 93, thereby effecting an independent movement of said throttle valve sleeve and its air-admitting ports either increasing or decreasing the amount of air admitted. While this adjustment is being made the throttle lever 101 remains stationary. After this adjustment the throttle lever 101 may be operated in the usual manner.

Figures 1, 2, 15:
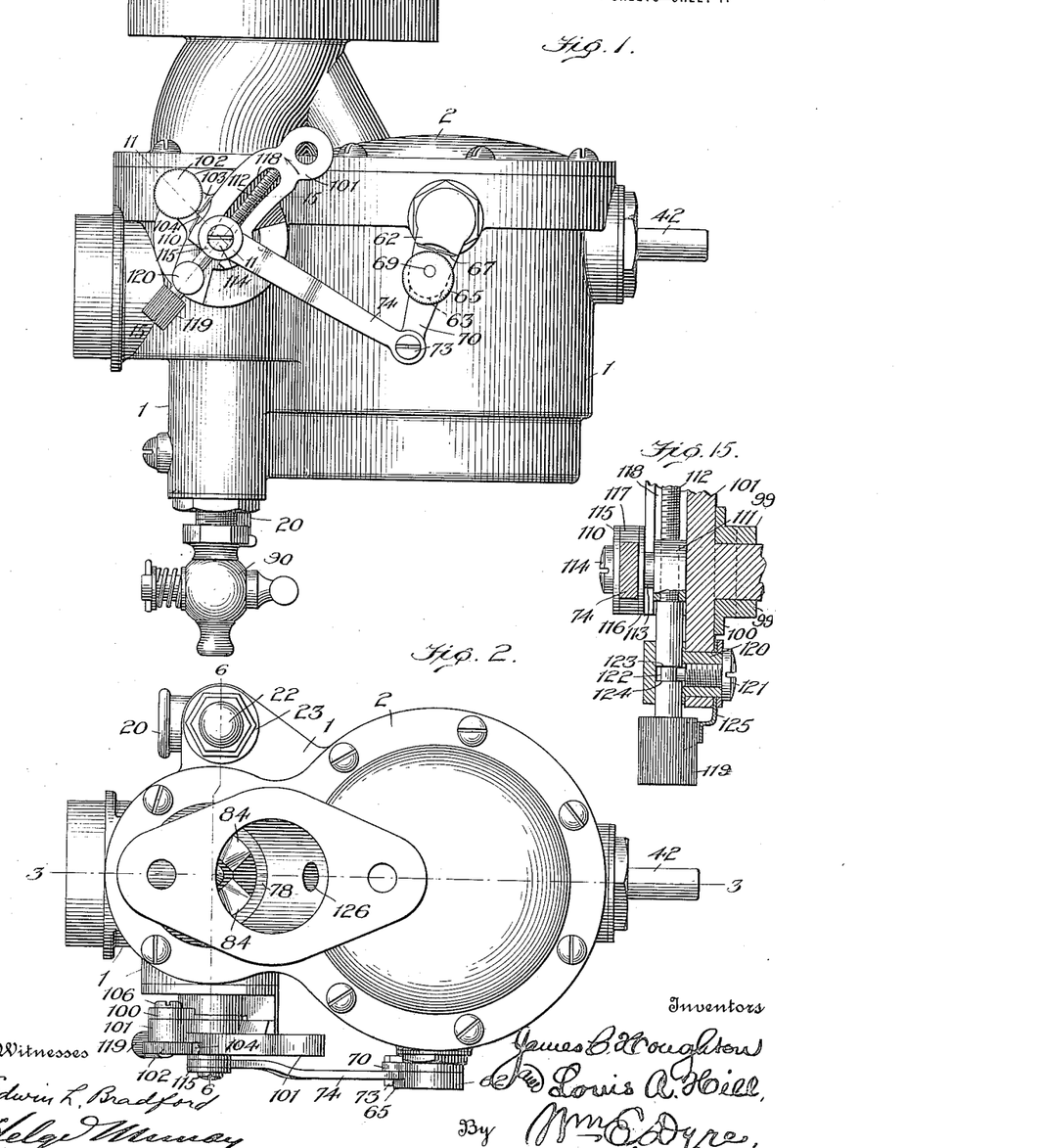
Figure 10:
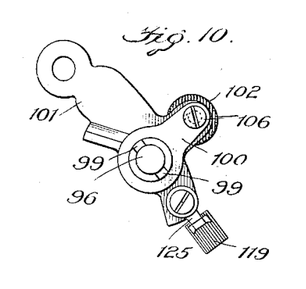
Fig. 10 is also a detached view showing in side elevation an arm for actuating the throttle valve, being a reverse view of the same arm as shown in Fig. 1.

The throttle lever 101 as shown by Figs. 1 and 10 is preferably of arcuate formation, the arc about which this lever is constructed being struck from substantially the pivotal connection between the link 74 and arm 70 forming part of the variable pressure regulating mechanism heretofore described. By this arrangement and interconnection of parts it will be seen that an independent adjustment regulating the throw of the throttle lever can be effected without in any manner disturbing the independent adjustments previously given the variable pressure-regulating valve and the throttle valve.

The adjustment of the throttle mechanism is effected by means of the following construction, in which 110 represents the adjustable pivotal connection between link 74 and the throttle lever 101. Upon the latter lever 101 is mounted a traveling nut 111 through which a relatively fixed feed screw 112 passes. A stud 113 is provided on the nut 111, into which a fastening screw 114 is threaded. Between the head of this screw 114 and a washer 115 a flanged bushing 116 is provided, and upon this bushing is pivotally mounted the end 117 of link 74 (see Fig. 11) for pivotally connecting the throttle lever 101 with the depending arm or lever 70 of the variable pressure regulating valve before described. Thus it will be seen that as the nut 111 is fed along the screw 112 the pivotal connection 110 will be moved within the arcuate slot 118 of lever 101 (see Fig. 1), this movement of said traveling nut 111 and operative connections being effected by manipulation of the knurled head 119 upon the feed screw 112 (see Fig. 15). The said feed screw 112 is mounted in a bearing formed in a stud 120 carried by the lever 101, and is held against longitudinal movement by a set screw 121 which enters an annular groove 122 formed in the screw between collars or shoulders 123 and 124. This set screw also secures in place the said stud 120, as well as a tension spring 125 adapted to engage the knurled head of the set screw 121, as best shown by Figs. 10 and 15. In this correlative arrangement and combination of parts it will be obvious that an independent adjustment can readily be given the actual range of the throttle valve connections, without in the least disturbing those of the variable pressure regulating valve and its connections.

In the cover section 2 of the carbureter there is provided a large open duct 126 as shown by Fig. 3, leading into or adjacent to the inlet manifold of the engine, the purpose of which is to establish communication at all times between float chamber 3 and the mixing chamber 6 adjacent to the said inlet manifold, thereby always maintaining a balance of pressure in said float chamber and mixing chamber, regardless of whether such pressure be atmospheric or partial vacuum varying in accordance with the speed of the motor and other conditions.

It is obvious that the liquid fuel has two outlets from pressure chamber 4, one by way of fuel discharge tube 87 and conduit 91; and the other by way of pressure regulating valve 52 into fuel reservoir 3, the latter flow being more or less restricted by the tension of spring 58, which tension in turn is regulated by the controlling throttle and intermediate connections. It will also be apparent that the return to reservoir 3 of excess fuel by way of pressure regulating valve 52 as aforesaid, would be influenced by pressure conditions upon opposite sides of pressure chamber 4 unless equalizing means such as duct 126 was provided.

It is well understood that carbureters ordinarily depend upon a partial vacuum in the engine manifold induced by suction of the engine pistons to produce a flow of liquid fuel. As a consequence the delivery of both fuel and air and the mixture of these two elements ordinarily fluctuates under influence of varying barometric and temperature conditions, and to overcome this difficulty the said equalizing duct 126 has been provided. Thus the liquid fuel supply is mechanically and positively controlled by means of pump 24 and its coöperating pressure regulating valve 52, and is uninfluenced by partial vacuum conditions which are equalized in the inlet manifold and the float chamber 3.

The foregoing being a description of the present invention in the best form of construction at present known to us, the practical operation may be briefly stated to be substantially as follows: Liquid fuel from the float feed or supply reservoir 3 is forced through the rotary pump into the pressure chamber 4 beneath, thence up through fuel-jet tube 87 and out of its constricted nozzle 88 in an exceedingly fine stream. An excess amount of fuel is at all times supplied to the tube 87, but by reason of the constricted formation of its nozzle 88 only a predetermined quantity thereof is used, the remainder being returned from pressure chamber 4 to the feed supply reservoir 3, by way of the variable pressure regulating valve 52 the operation whereof has been heretofore described.

When the carbureter is set and adjusted as shown by the drawings, the mixture produced will be sufficient to barely keep the engine running at slow speed, the air which is admitted through the throttle valve, and the liquid fuel which is forced through nozzle 88, as aforesaid, being most effectually mixed, presented thence to the manifold, and finally to the cylinders of the engine.

The operation of the several parts shown in the drawings, when it is desired to speed up, is substantially as follows: The means connected to the throttle lever 101 and under control of the operator, is first manipulated in the usual manner, the throttle lever 101 being thereby swung at its upper end in the direction indicated by the arrow in Fig. 1. When this takes place the throttle valve sleeve 75 equipped with the beveled segment 93 is rotated by agency of the key or lug 99 upon the inner end of arm 100, the sleeve 95, and the driving segment 94 carried by said sleeve and always intermeshing with the driven segment 93 aforesaid. As the throttle lever is further moved the said outer sleeve 75 is moved correspondingly, its triangular ports 80 being thus gradually but positively brought into register with ports 83 of the relatively fixed inner sleeve 76, until the full port is opened and the highest speed for the given adjustment obtained.

The adjustment illustrated in the accompanying drawings (see Fig. 1 particularly) provides for no movement of the variable pressure regulating mechanism when the pivoted lever 101 is swung to open the air throttle; that is to say in this adjustment no movement is transmitted to depending arm 70 through the interconnecting link 74, for the reason that the pivotal connection 110 of said link 74 with the lever 101 is then in exact alinement with the pivot about which said throttle lever 101 swings. Nevertheless, the variable pressure regulating valve 52, having previously been set by its independent adjustment heretofore described, will operate against the action of spring 58 as the pressure in the pressure chamber 4 returns the excess of liquid fuel over and above that forced through the nozzle 88 and utilized. Under these conditions, however, it will be seen that valve 52 acts uniformly against the tension of its spring. Assuming now that the traveling nut 111 has been adjusted in the arcuate slot 118 thereby bringing the pivotal connection 110 out of alinement with the pivot upon which the throttle lever 101 is mounted, it will be readily seen that as said lever is swung at its free end in the direction of the arrow, link 74 will be correspondingly moved more or less according to its selective location in said arcuate slot 118 thus imparting to the depending arm 70 of the variable pressure regulating mechanism a corresponding movement to increase the tension upon the variable valve spring 58, further restricting the passage of liquid fuel through said valve 52. Continued movement of said throttle lever 101 will now serve to gradually increase the tension upon spring 58 thereby requiring greater pressure in pressure chamber 4 for the return of excess fuel to reservoir 3.

The proper forcing power of the actuating pump being predetermined it will be observed that as the variable pressure regulating valve 52 is held more nearly seated a greater quantity of liquid fuel will be sent through the nozzle 88 into a correspondingly increased quantity of air, thus producing an efficient and very economical working mixture. And when desired, an independent adjustment as before described, may be given both the variable pressure regulating valve, and the throttle valve for controlling the air supply, without disturbing the relatively fixed movements of the throttle valve interconnected with the variable pressure regulating valve.

Having thus described our invention, that which we now claim and desire to secure by Letters Patent is:

1. A carbureter including in combination a source of fuel supply, an air inlet, a fuel reservoir, means connected with said reservoir for forcing liquid fuel in quantities exceeding that actually presented to the air supply, and means interconnected with the throttle for returning and regulating the return of such excess of liquid fuel to the reservoir.

2. A carbureter including in combination a source of fuel supply, an air inlet, a fuel reservoir, a pressure chamber communicating with said reservoir, means located between said float feed reservoir and pressure chamber for forcing the liquid fuel to its point of utilization, and means interconnected with the throttle for returning and regulating the return of such excess of liquid fuel to the reservoir.

3. A carbureter including in combination a source of fuel supply, an air inlet, means including a power driven rotary pump for forcing liquid fuel into the air supply, and a pressure regulating valve for returning such excess of liquid fuel to the reservoir.

4. A carbureter including in combination a source of fuel supply, an air inlet, a fuel reservoir, a pressure chamber communicating with said reservoir, and means including a pump submerged beneath the liquid fuel level in said reservoir for forcing liquid fuel into the air supply, and regulable means interconnected with the throttle for returning to said reservoir the excess quantities of liquid fuel not forced into the air supply.

5. A carbureter including in combination a source of fuel supply, an air inlet, a fuel reservoir, a pressure chamber communicating with said reservoir, means for forcing liquid fuel through the pressure chamber into the air supply, and regulable means interconnected with the throttle located between the said reservoir and pressure chamber for returning the excess quantities of liquid fuel not forced into the air supply.

6. A carbureter including in combination a source of fuel supply, an air inlet, a fuel reservoir, a pressure chamber communicating with said reservoir, means for forcing liquid fuel through the pressure chamber into the air supply, and means located between said fuel reservoir and pressure chamber including a variable pressure regulating valve for returning the excess quantities of liquid fuel not forced into the air supply.

7. A carbureter including in combination a source of fuel supply, a valve-controlled air inlet, a fuel reservoir, a pressure chamber communicating with said reservoir, means for forcing liquid fuel through the pressure chamber into the air supply, and means located between said fuel reservoir and pressure chamber including a variable pressure regulating valve for returning the excess quantities of liquid fuel not forced into the air supply.

8. A carbureter including in combination an air inlet, a nozzle, a rotary throttle valve consisting of inner and outer sleeves having registerable ports formed therein, channel-shaped air-directing members converging toward said nozzle from the ports of said inner sleeve, and means for operating said throttle valve.

9. A carbureter including in combination an air inlet, a nozzle, a rotary throttle valve consisting of inner and outer sleeves having registerable ports formed therein, channel-shaped air-directing members converging toward said nozzle from the ports of said inner sleeve and having constricted upper ends, and means for operating said throttle valve.

10. A carbureter including in combination an air inlet, a nozzle, a rotary cylindrical throttle valve consisting of relatively fixed and movable inner and outer sleeves having registerable ports formed therein, channel-shaped air-directing members converging inwardly from the ports of said inner sleeve and having constricted and angularly arranged upper ends adapted to centrally focus upon said nozzle, and means for manually operating said throttle valve.

11. A carbureter including in combination a source of fuel supply, an air inlet, a reservoir, a pressure chamber communicating with said reservoir, means for forcing liquid fuel through said pressure chamber into the air supply, a variable pressure regulating valve located between the said reservoir and pressure chamber, means for controlling the air inlet, and means for interconnecting the variable pressure regulating valve with means for controlling the admission of air.

12. A carbureter including in combination a source of fuel supply, a valve controlled air inlet, a reservoir, a pressure chamber communicating with said reservoir, means located between the reservoir and pressure chamber for forcing liquid fuel through said pressure chamber into the air supply, a variable pressure regulating valve located between the said reservoir and pressure chamber, and means interconnecting a valve controlling the air inlet with the variable pressure regulating valve whereby pressure in the pressure chamber will be automatically controlled in returning to the said reservoir the excess of liquid fuel.

13. A carbureter including in combination a source of fuel supply, an independently adjustable valve controlled air inlet, a reservoir, a pressure chamber communicating with said reservoir, means located between said reservoir and pressure chamber for forcing liquid fuel through the pressure chamber into the air supply, a variable pressure regulating valve between said reservoir and pressure chamber capable of independent adjustment with relation to the valve controlled air inlet, means interconnecting said variable pressure regulating valve with the valve controlled air inlet capable of independent adjustment with relation to both of said valves, and means for operating said air inlet valve.

14. A carbureter including in combination a source of fuel supply, a fuel reservoir, means connected with said reservoir for forcing liquid fuel into the air supply, and regulable means for returning to said reservoir excess quantities of liquid fuel not forced into the air supply, and an equalizing duct connecting said fuel reservoir above its fuel level with the mixing chamber of the carbureter, whereby pressure conditions in the fuel reservoir and mixing chamber are equalized.

15. A carbureter including in combination a source of fuel supply, a fuel reservoir atmospherically sealed, means connected with said reservoir for forcing liquid fuel into the air supply, regulable means for returning to said reservoir excess quantities of liquid fuel not forced into the air supply, and an equalizing duct connecting said reservoir above its fuel level with the mixing chamber of the carbureter, whereby pressure conditions in said fuel reservoir and mixing chamber are instantly equalized.

In testimony whereof we affix our signatures, in presence of two subscribing witnesses.

JAMES C. HOUGHTON.
LOUIS A. HILL.

Witnesses:
 THOMAS DURANT,
 WM. E. DYRE.